(12) United States Patent
Byerly et al.

(10) Patent No.: US 9,739,371 B1
(45) Date of Patent: Aug. 22, 2017

(54) TORQUE CONVERTER LOCKUP CLUTCH SLIP CONTROL

(71) Applicant: Allison Transmission, Inc., Indianapolis, IN (US)

(72) Inventors: John Byerly, Indianapolis, IN (US); Jeff Shultz, Zionsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 15/182,104

(22) Filed: Jun. 14, 2016

(51) Int. Cl.
*F16H 61/14* (2006.01)
*F16D 48/06* (2006.01)
*F16H 63/46* (2006.01)

(52) U.S. Cl.
CPC ........... *F16H 61/143* (2013.01); *F16D 48/06* (2013.01); *F16H 63/46* (2013.01)

(58) Field of Classification Search
None
See application file for complete search history.

(56) References Cited

U.S. PATENT DOCUMENTS

| | | | |
|---|---|---|---|
| 4,478,322 A | 10/1984 | Carlson et al. | |
| 4,676,353 A | 6/1987 | Matsuda | |
| 4,971,183 A | 11/1990 | Tellert | |
| 5,024,305 A | 6/1991 | Kurihara et al. | |
| 5,651,752 A | 7/1997 | Wakahara et al. | |
| 5,722,912 A | 3/1998 | Narita | |
| 6,056,667 A | 5/2000 | Sasaki | |
| 6,102,831 A | 8/2000 | Wakahara et al. | |
| 6,231,480 B1 | 5/2001 | Sasaki | |
| 6,597,979 B2 | 7/2003 | Hagiwara et al. | |
| 7,044,890 B2 | 5/2006 | Kojima et al. | |
| 7,490,588 B2 | 2/2009 | Kimura et al. | |
| 7,578,769 B2 | 8/2009 | Kageyama et al. | |
| 7,815,543 B2 | 10/2010 | Kakiuchi et al. | |
| 7,996,139 B2 | 8/2011 | Okuda et al. | |
| 8,326,508 B2 | 12/2012 | Yamada | |
| 8,374,759 B2 | 2/2013 | Arlauskas et al. | |
| 2007/0005211 A1 | 1/2007 | Katsumata et al. | |
| 2012/0071297 A1* | 3/2012 | Enomoto | F16H 61/66259 477/86 |
| 2012/0142494 A1* | 6/2012 | Yamada | B60W 10/026 477/175 |
| 2012/0220424 A1 | 8/2012 | Staudinger et al. | |
| 2014/0288807 A1* | 9/2014 | Tribulowski | F02N 11/0818 701/112 |
| 2015/0032349 A1* | 1/2015 | Sato | F16H 61/143 701/68 |

FOREIGN PATENT DOCUMENTS

EP 0242127 A2 10/1987

* cited by examiner

*Primary Examiner* — Justin Holmes
(74) *Attorney, Agent, or Firm* — Barnes & Thornburg LLP

(57) ABSTRACT

A method and system are provided for operating a lockup clutch of a torque converter of a motor vehicle. The torque converter includes a pump rotatably driven by a drive unit, a rotatable turbine fluidly coupled to the pump and configured to drive an input shaft of a transmission, and a lockup clutch selectively engageable to non-fluidically couple the pump to the turbine to transmit torque from the drive unit to the transmission. The operation of the lockup clutch is controlled by the system in response to detecting that the motor vehicle is coasting.

20 Claims, 6 Drawing Sheets

TORQUE CONVERTER LOCKUP CLUTCH SLIP CONTROL

TECHNICAL FIELD

The present disclosure relates generally to torque converters, and more particularly, to the operation of a lockup clutch included in the torque converters.

BACKGROUND

Conventional torque converters are typically positioned between an upstream drive unit, such as an internal combustion engine, and a downstream transmission, and include a pump that is driven by the drive unit, a turbine that is fluidly coupled to the pump and connected to the transmission, and a lockup clutch that is engageable to mechanically couple the drive unit to the transmission. In some implementations, the engagement of the lockup clutch is controlled to promote fuel economy during certain operating conditions.

SUMMARY

According to one aspect of the present disclosure, a system for a vehicle includes a drive unit, a transmission, and a torque converter. The drive unit is configured to output torque, and the drive unit includes an output shaft. The transmission is configured to transmit torque output by the drive unit to a load, and the transmission includes an input shaft. The torque converter is coupled between the drive unit and the transmission. The torque converter includes a pump coupled to the output shaft of the drive unit, a turbine coupled to the input shaft of the transmission, a lockup clutch selectively engageable to mechanically couple the pump to the turbine to transmit torque between the drive unit and the transmission, and a torque converter controller having a processor and memory. The memory has instructions stored therein that are executable by the processor to cause the processor to (i) determine whether the vehicle is in a coasting condition, (ii) determine whether a rotational speed of the output shaft of the drive unit has reached a target speed above a reference threshold, and (iii) engage the lockup clutch to maintain the rotational speed of the output shaft above the reference threshold in response to a determination that the motor vehicle is in the coasting condition and that the rotational speed of the output shaft has reached the target speed.

In some embodiments, to engage the lockup clutch may include to engage the lockup clutch to transmit torque from the turbine to the pump. To engage the lockup clutch may include to partially engage the lockup clutch to achieve slip between the turbine and the pump characterized by a rotational speed of the turbine being greater than a rotational speed of the pump.

In some embodiments, the reference threshold may define a rotational speed of the output shaft of the drive unit associated with idle operation of the drive unit, and to engage the lockup clutch to maintain the rotational speed of the output shaft above the reference threshold may include to control slip between the turbine and the pump to maintain the rotational speed of the output shaft above the reference threshold to avoid fuel consumption during idle operation of the drive unit. Additionally, in some embodiments, to determine whether the vehicle is in the coasting condition may include to determine whether the vehicle is in the coasting condition based on (i) a road grade signal indicative of a grade of a surface in contact with the vehicle, (ii) a torque signal indicative of torque associated with the drive unit, (iii) an accelerator pedal signal indicative of depression of an accelerator pedal of the motor vehicle, (iv) a brake pedal signal indicative of depression of a brake pedal of the motor vehicle, and (v) a user input signal indicative of activity performed by a user.

In some embodiments, to engage the lockup clutch may include to receive a signal indicative of a rotational speed of the turbine and determine a target torque output by the pump based on the target speed of the output shaft of the drive unit and the signal. To engage the lockup clutch may include to receive a torque signal indicative of torque associated with the drive unit. To engage the lockup clutch may include to calculate a lockup clutch torque based on the determined target torque output by the pump and the torque signal.

According to another aspect of the present disclosure, a control system for a vehicle that includes a drive unit, a transmission, and a torque converter having a lockup clutch selectively engageable to mechanically couple a pump of the torque converter to a turbine of the torque converter includes a plurality of sensors, a drive unit speed sensor, and a torque converter controller. The plurality of sensors are configured to produce sensor data cooperatively indicative of a coasting condition of the vehicle. The drive unit speed sensor is configured to provide a signal indicative of a rotational speed of an output shaft of the drive unit. The torque converter controller is coupled to each of the plurality of sensors and the drive unit speed sensor, and the torque converter controller includes a processor and memory. The memory has instructions stored therein that are executable by the processor to cause the processor to (i) determine whether the vehicle is in the coasting condition based on the sensor data produced by the plurality of sensors, (ii) determine whether the rotational speed of the output shaft of the drive unit has reached a target speed above a reference threshold based on the signal from the drive unit speed sensor, and (iii) engage the lockup clutch to maintain the rotational speed of the output shaft above the reference threshold in response to a determination that the vehicle is in the coasting condition and that the rotational speed of the output shaft has reached the target speed.

In some embodiments, the control system may further include a turbine speed sensor coupled to the torque converter controller and configured to provide a signal indicative of a rotational speed of the turbine, and to engage the lockup clutch may include to determine a target torque output by the pump based on the target speed of the output shaft of the drive unit and the signal from the turbine speed sensor. The plurality of sensors may include a drive unit torque sensor configured to provide a signal indicative of torque associated with the drive unit, and to engage the lockup clutch may include to receive the signal from the drive unit torque sensor. To engage the lockup clutch may include to calculate a lockup clutch torque based on the determined target torque output by the pump and the signal from the drive unit torque sensor. To engage the lockup clutch may include to engage the lockup clutch so that the calculated lockup clutch torque is transmitted to the output shaft of the drive unit.

In some embodiments, the plurality of sensors may include (i) a road grade sensor configured to provide a signal indicative of a grade of a surface in contact with the vehicle, (ii) a drive unit torque sensor configured to provide a signal indicative of torque associated with the drive unit, (iii) an accelerator pedal sensor configured to provide a signal indicative of depression of an accelerator pedal of the vehicle, (iv) a brake pedal sensor configured to provide a signal indicative of depression of a brake pedal of the vehicle, and (v) a shift selector configured to provide a signal indicative of activity performed by a user. To determine whether the vehicle is in the coasting condition may include to (i) determine whether the grade of the surface exceeds a reference road grade threshold for a reference time period based on the signal from the road grade sensor, (ii) determine whether the torque associated with the drive unit exceeds a reference torque threshold for a reference time period based on the signal from the drive unit torque sensor, (iii) determine whether the accelerator pedal is depressed for a reference time period based on the signal from the accelerator pedal sensor, (iv) determine whether the brake pedal is depressed for a reference time period based on the signal from the brake pedal sensor, and (v) determine whether activity is performed by the user based on the signal from the shift selector.

According to yet another aspect of the present disclosure, a method of operating a vehicle that includes a drive unit, a transmission, and a torque converter having a lockup clutch selectively engageable to mechanically couple a pump of the torque converter to a turbine of the torque converter is executable by a torque converter controller of the torque converter and includes (i) determining, based on sensor data from a plurality of sensors, whether the vehicle is in a coasting condition, (ii) determining, based on a signal provided by a drive unit speed sensor included in the plurality of input devices, whether a rotational speed of an output shaft of the drive unit has reached a target speed above a reference threshold, and (iii) engaging the lockup clutch to maintain the rotational speed of the output shaft above the reference threshold in response to a determination that the vehicle is in the coasting condition and that the rotational speed of the output shaft has reached the target speed.

In some embodiments, the method may further include receiving a signal from a turbine speed sensor indicative of a rotational speed of the turbine, and engaging the lockup clutch may include determining a target torque output by the pump based on the target speed of the output shaft of the drive unit and the signal from the turbine speed sensor. The method may further include receiving a signal from a drive unit torque sensor indicative of torque associated with the drive unit, and engaging the lockup clutch may include calculating a lockup clutch torque based on the determined target torque output by the pump and the signal from the drive unit torque sensor. Engaging the lockup clutch may include engaging the lockup clutch so that the calculated lockup clutch torque is transmitted to the output shaft of the drive unit.

Additionally, in some embodiments, determining whether the vehicle is in the coasting condition may include (i) determining whether a grade of a surface in contact with the vehicle exceeds a reference road grade threshold for a reference time period based on a signal from a road grade sensor, (ii) determining whether torque associated with the drive unit exceeds a reference torque threshold for a reference time period based on a signal from a drive unit torque sensor, (iii) determining whether an accelerator pedal is depressed for a reference time period based on a signal from an accelerator pedal sensor, (iv) determining whether a brake pedal is depressed for a reference time period based on a signal from a brake pedal sensor, and (v) determining whether activity is performed by a user based on a signal from a shift selector.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
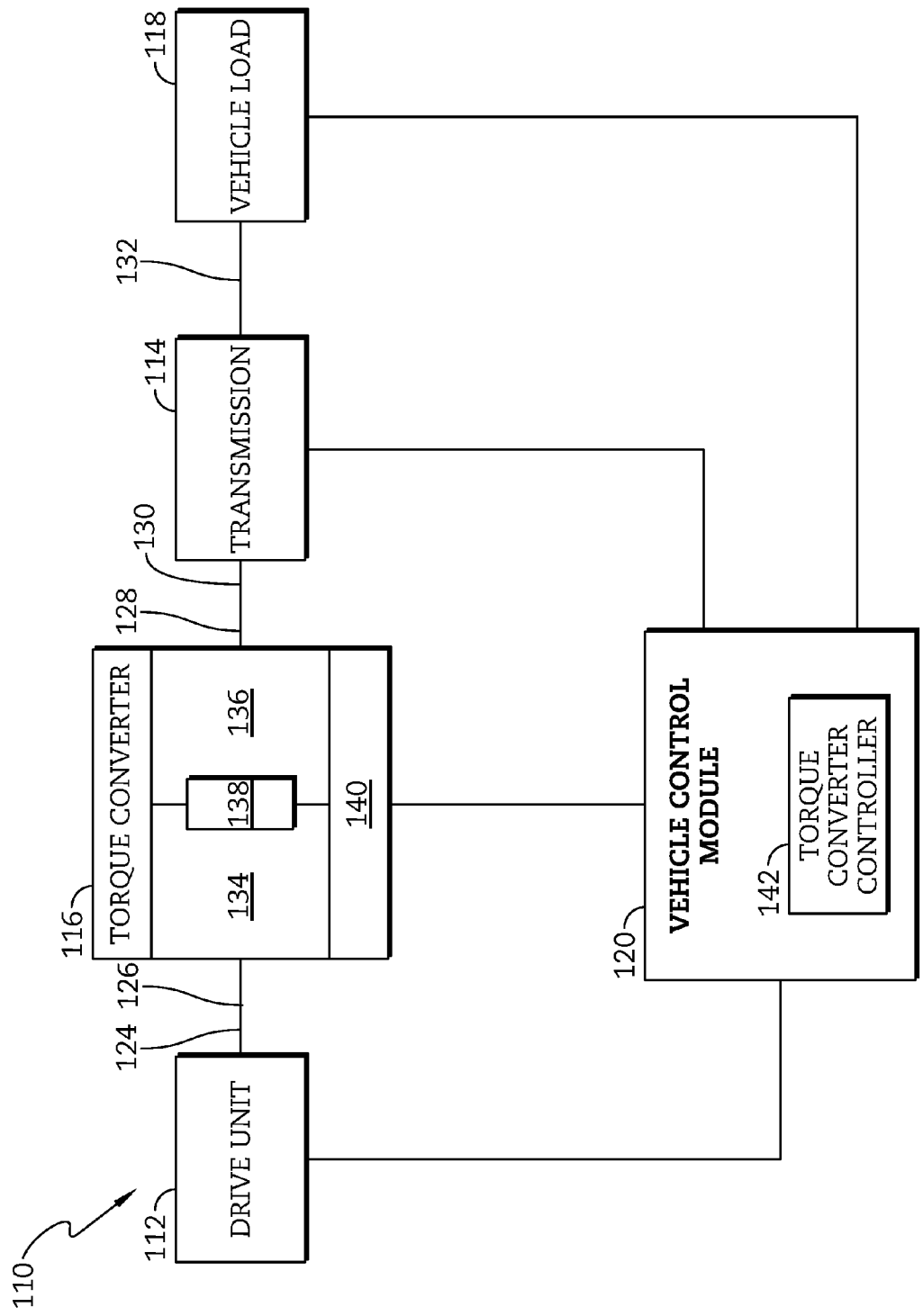
FIG. 1 is a block diagrammatic view of a motor vehicle including a torque converter having a lockup clutch.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative motor vehicle 110 includes a drive unit 112, a transmission 114, a torque converter 116 coupling the drive unit 112 to the transmission 114, and a vehicle load 118 coupled to the transmission 114. The illustrative torque converter 116 includes a lockup clutch 140 as shown in FIG. 1. In certain situations, the lockup clutch 140 is partially engageable to couple the drive unit 112 to the transmission 114. More specifically, as described in greater detail below, the lockup clutch 140 is partially engageable to couple the drive unit 112 to the transmission 114 in response to determining that the vehicle 110 is in a coasting condition and that the rotational speed of the drive unit 112 has reached a target speed above a reference threshold. Such partial engagement of the lockup clutch 140 maintains the rotational speed of the drive unit 112 above the reference threshold, which provides fuel economy benefits for the vehicle 110 as discussed below The drive unit 112 is illustratively embodied as a diesel engine. However, the drive unit 112 may be embodied as any type of motor or internal combustion engine having a reciprocating or a rotary configuration that provides rotational power to the transmission 114 and therethrough to the vehicle load 118. For example, the drive unit 112 may be embodied as a spark-ignition engine (i.e., a gasoline engine) or a rotary engine. The transmission 114 is illustratively embodied as an automatic transmission. For example, the transmission 114 may be embodied as a continuously-variable transmission that includes a variable-ratio unit, an automated-manual transmission, a dual clutch transmission, or other automatic transmission. In other embodiments, however, the transmission 114 may be embodied as any other suitable transmission, such as an automated-manual transmission or a manual transmission, for example. The vehicle load 118 may be embodied as, or otherwise include, drive wheels, caterpillar tracks, propels, etc. that impart the motor vehicle 110 with locomotion when driven by the drive unit 112 via the transmission 114. Additionally, the vehicle load 118 may be embodied as an auxiliary gearbox (e.g., a transfer case or drop box) or a power take-off device, such as a pump, mixer, lifter, shoveler, compressor, compactor, or blower.

The motor vehicle 110 further includes a vehicle control module 120 that is coupled to and configured to control the drive unit 112, the transmission 114, the torque converter 116, and the vehicle load 118 during operation of the motor vehicle 110 as shown in FIG. 1. The vehicle control module 120 includes one of more control circuits configured to control individual components of the motor vehicle 110. For example, the vehicle control module 120 may be embodied as, or otherwise include, an engine control circuit (not shown) configured to control the operation of the drive unit 112, a transmission control circuit (not shown) configured to control the operation of the transmission 114, and/or a torque converter control circuit configured to control the operation of the torque converter 116. The vehicle control module 120, as discussed in more detail below, receives electrical inputs from sensors or other devices included in, or coupled to, one of the drive unit 112, the transmission 114, the torque converter 116, and the vehicle load 118. The vehicle control module 120 may be contained in a housing (not shown) separate from the drive unit 112, the transmission 114, the torque converter 116, and the vehicle load 118. Although the illustrative vehicle control module 120 integrates the control circuits for each of the drive unit 112, the transmission 114, and the torque converter 116, those control circuits may be separated from one another and coupled to each of the components controlled by the control circuits. In such embodiments, the separated control circuits may also communicate with each other through a dedicated or shared communication interface.

The illustrative drive unit 112 includes a drive unit output shaft 124 coupled to a pump shaft 126 included in the torque converter 116 as shown in FIG. 1. The pump shaft 126 is coupled to a turbine shaft 128 included in the torque converter 116, and the turbine shaft 128 is coupled to a transmission input shaft 130 included in the transmission 114. The transmission input shaft 130 is coupled to a transmission output shaft 132 included in the transmission 114, and the transmission output shaft 132 is coupled to the vehicle load 118. In certain situations, rotational power generated by the drive unit 112 may be transmitted to the pump shaft 126 by the drive unit output shaft 124, to the transmission input shaft 130 through the pump and turbine shafts 126, 128, and to the vehicle load 118 through the transmission input and output shafts 130, 132. In other situations, such as when the motor vehicle 110 is in a coasting condition as discussed in greater detail below, rotational power associated with the vehicle load 118 may be transmitted to the turbine shaft 128 of the torque converter 116 through the input and output shafts 130, 132 of the transmission 114, to the pump shaft 126, and to the drive unit output shaft 124 of the drive unit 112.

The transmission 114 ensures the controlled application of rotational power generated by the drive unit 112 to the vehicle load 118. Depending on the specific implementation, the transmission 114 may include gearsets that enable speed and torque generated by the drive unit 112 to be converted for use by the vehicle load 118 and torque-transmitting mechanisms (e.g. clutches) that are selectively engageable to define torque transfer paths between components included in the transmission 114. The transmission 114 may be operable in a number of operating modes to transmit rotational power supplied by the drive unit 112 from the transmission input shaft 130 to the transmission output shaft 132. Each operating mode may enable at least one ratio of input speed (i.e., at the transmission input shaft 130) to output speed (i.e., at the transmission output shaft 132) to be achieved.

The torque converter 116 is illustratively embodied as a conventional-type torque converter that includes the pump shaft 126, a pump or impeller 134 supported on the pump shaft 126, the turbine shaft 128, a turbine 136 supported on the turbine shaft 128, a stator 138 positioned between the pump 134 and the turbine 136, and the lockup clutch 140 as shown in FIG. 1. The pump shaft 126, the pump 134, the turbine shaft 128, the turbine 136, the stator 138, and the lockup clutch 140 are supported by a housing (not shown) of the torque converter 116.

In certain situations, when the lockup clutch 140 of the torque converter 116 is disengaged, rotational power supplied to the pump shaft 126 by the drive unit 112 is magnified so that a greater amount of rotational power is transmitted to the turbine shaft 128 than is received by the pump shaft 126. Hydraulic fluid is supplied from a fluid supply (not shown) into the housing of the torque converter 116 such that the pump 134, when rotatably driven by the output shaft 124 of the drive unit 112, displaces the hydraulic fluid to the turbine 136. Hydraulic fluid reaching the turbine 136 causes the turbine to rotate, thereby rotatably driving the turbine shaft 128 and the transmission input shaft 130 coupled to the turbine shaft 128. As such, the fluidic coupling between the pump 134 and the turbine 136 couples the output shaft 124 of the drive unit 112 to the input shaft 130 of the transmission 114. Fluid displaced from the pump 134 to the turbine 136 passes over a plurality of fins (not shown) included in the stator 138 such that the stator displaces a portion of the hydraulic fluid back to the pump 134. Fluid displaced to the pump 134 from the stator 138 is then displaced again by the pump 134 to the turbine 136 so that the turbine shaft 128, and the input shaft 130 of the transmission 114 coupled thereto, is rotatably driven. In this fashion, the pump 134, the turbine 136, and the stator 138 cooperate to magnify the torque transmitted to the pump shaft 126 so that a greater amount of torque is transmitted from the turbine shaft 128 to the transmission 114 than is received by the pump shaft 126.

In other situations, when the lockup clutch 140 of the torque converter 116 is engaged, no torque magnification occurs between the pump shaft 126 and the turbine shaft 128. Engagement of the lockup clutch 140 of the torque converter 116 couples the pump 134 directly to the turbine 136, thereby effecting a "direct" mechanical (i.e., non-fluidic) coupling between the output shaft 124 of the drive unit 112 and the input shaft 130 of the transmission 114. The coupling effected by the lockup clutch 140 is "direct" in that torque is transmitted at a 1:1 ratio from the drive unit 112 to the transmission 114 (i.e., the transmission 114 receives all the torque generated by the drive unit 112). When the lockup clutch 140 is disengaged, however, the fluidic coupling between the pump 134 and the turbine 136 discussed above establishes a "non-direct" fluid coupling between the drive unit 112 and the transmission 114. The coupling established when the lockup clutch 140 is disengaged is "non-direct" in that some portion of the torque generated by the drive unit 112 is not transmitted to the transmission 114. The portion of the torque generated by the drive unit 112 that is not transmitted to the transmission 114 may be dissipated as a result of frictional losses, for example.

The engagement/disengagement of the lockup clutch 140 is effected by selectively supplying hydraulic fluid from the fluid supply to the lockup clutch 140. The supply of hydraulic fluid to the lockup clutch 140 may be controlled by an electro-hydraulic control (not shown). The electro-hydraulic control may include one or more trim systems configured to supply one or more reference fluid pressures to one or more shift valves that are directly fluidly coupled to the lockup clutch 140.

During operation of the motor vehicle 110, control of the torque converter 116 via the vehicle control module 120 may be necessary to ensure that the pump 134 and the turbine 136 rotate at different speeds, a condition known as "slippage." Slippage or slip between the pump 134 and the turbine 136 may be desirable for a number of operations, such as: launching the vehicle 110 from rest, accelerating from a lower speed to a higher desired speed, and shifting gears to transition from one gear ratio to another. As discussed in greater detail below, in the illustrative embodiment, slip is controlled in certain situations by the vehicle control module 120 to promote fuel economy by reducing fuel consumed by the drive unit 112.

The vehicle control module 120, as discussed in greater detail below with respect to FIGS. 2-5, is configured to detect when the motor vehicle 110 is coasting (i.e., the coasting condition of the vehicle 110) based on input data provided to the vehicle control module 120. In response to detecting that the vehicle 110 is coasting, the vehicle control module 120 is configured to disengage or release the lockup clutch 140 of the torque converter 116 for a reference amount of time. Controlling the disengagement of the lockup clutch 140 in this manner promotes fuel economy and may enable the motor vehicle 110 to coast over a farther distance than would otherwise be the case if the lockup clutch 140 were engaged, as further described below.

Figure 6:
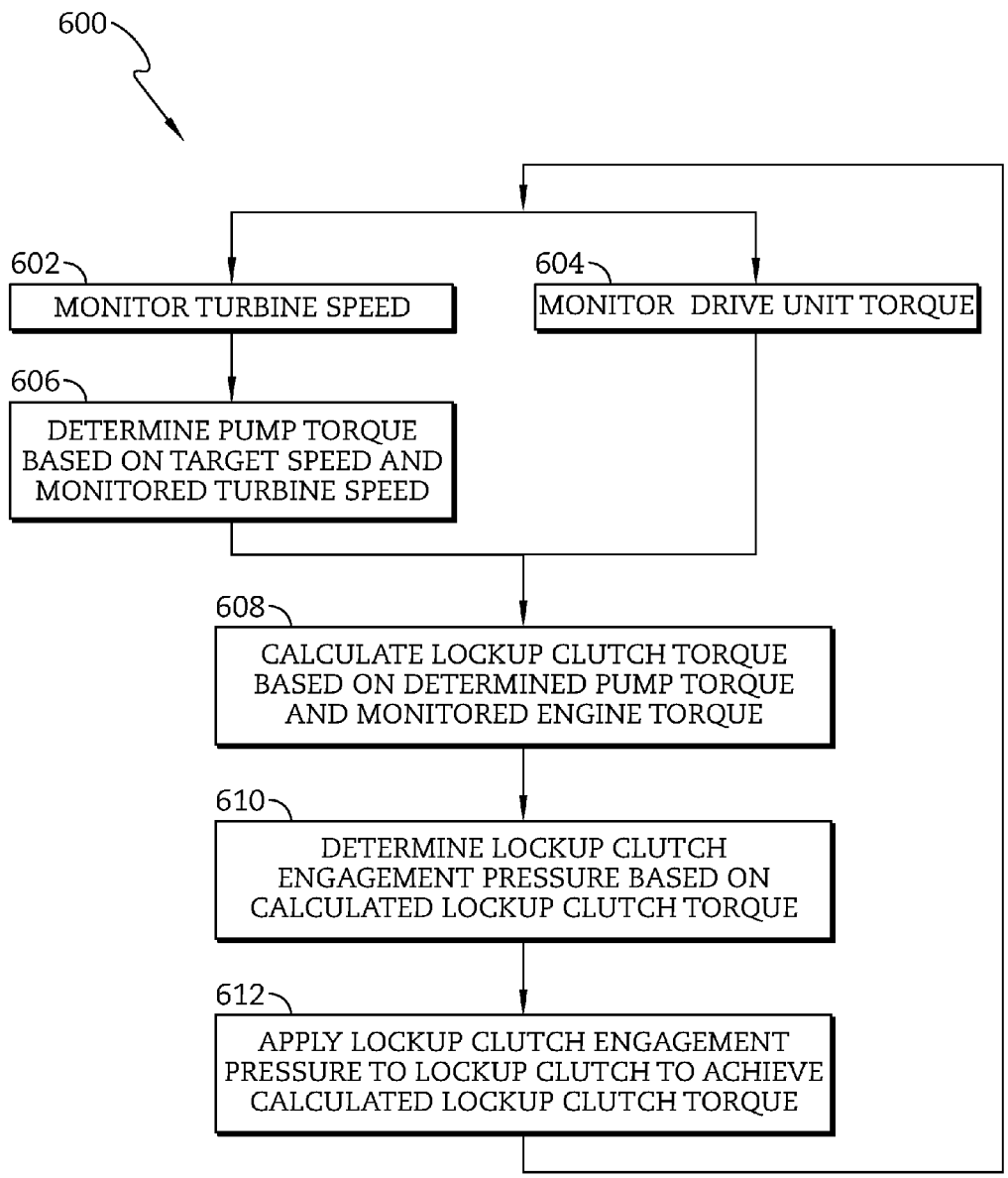
FIG. 6 is a flowchart of a method for selectively engaging the torque converter lockup clutch of FIG. 1 that may be executed by the vehicle control module of FIG. 2.

Subsequent to disengagement of the lockup clutch 140 in response to detection of the coasting condition, the vehicle control module 120, as discussed in greater detail below with respect to FIG. 6, is configured to partially engage the lockup clutch 140 to control slip between the pump 134 and the turbine 136 (and thus between the pump and turbine shafts 126, 128). In doing so, the vehicle control module 120 controls the rotational speed of the drive unit output shaft 124 so that the rotational speed is above a reference threshold speed associated with idle operation of the drive unit 112. Because fuel is consumed by the drive unit 112 during idle operation thereof, control of the rotational speed of the drive unit output shaft 124 by the vehicle control module 120 in this fashion avoids or reduces consumption of fuel during idle operation of the drive unit 112, thereby promoting fuel economy.

During operation of the motor vehicle 110, coasting may be desirable when the motor vehicle 110 is traveling on a surface having a downwardly-sloping grade (e.g., the motor vehicle 110 is traveling downhill). Engaging the lockup clutch 140 while the vehicle 110 is coasting establishes a direct mechanical connection between the drive unit 112 and the vehicle load 118 through the transmission 114. Because additional power is not generated by the drive unit 112 while the vehicle 110 is coasting on the downwardly-sloping surface, the speed of the vehicle load 118 may exceed the output speed measured at the output shaft 124 of the drive unit 112. As a result, when the lockup clutch 140 is engaged while the motor vehicle 110 is coasting on the downwardly-sloping surface, a negative torque may be transmitted from the vehicle load 118 to the drive unit 112 through the coupling established between the drive unit 112, the torque converter 116, the transmission 114, and the drive load 118. The negative torque transmitted to the drive unit 112 may cause the drive unit 112 to stall. Disengaging the lockup clutch 140 while coasting reduces the amount of negative torque transmitted to the drive unit 112 from the vehicle load 118, thereby reducing the likelihood of the drive unit 112 stalling. Additionally, disengaging the lockup clutch 140 while coasting may enable the vehicle 110 to coast for a farther distance than would be the case if the lockup clutch 140 were engaged, thereby reducing the distance over which the vehicle operator may demand additional power from the drive unit 112 and consume fuel as a result. Finally, disengaging the lockup clutch 140 while coasting and while the transmission 114 is in a forward range may cause the output shaft 124 of the drive unit 112 to rotate above its idle speed, thereby avoiding fuel consumption that may occur during rotation of the shaft 124 at the idle speed.

To maximize or increase fuel economy benefits, disengagement of the lockup clutch 140 may be limited to certain situations. In one example, as described in greater detail below, disengagement of the lockup clutch 140 may be limited to situations in which the motor vehicle 110 is coasting and the disengagement frequency of the lockup clutch 140 is determined to be below a reference threshold that is not associated with excessive wear and/or degradation of the lockup clutch 140. In another example, disengagement of the lockup clutch 140 may be limited to situations in which the motor vehicle 110 is coasting and certain operating conditions are present. In that example, such operating conditions may include, but are not limited to, conditions in which a cruise control feature of the vehicle 110 is activated and the monitored speed of the vehicle 110 meets a reference speed, or falls within a reference range, associated with a particular degree of fuel savings for the vehicle 110 over a reference time period. Additionally, in that example, the reference speed or range may be established based on predictive information, such as global positioning satellite-type data, or based on driving conditions monitored in real-time.

When the lockup clutch 140 is disengaged in response to detection of the coasting condition, however, the drive unit output shaft 124 may rotate at or close to the reference threshold speed associated with the idle operation of the drive unit 112. To avoid or reduce fuel consumption during idle operation of the drive unit 112, the vehicle control module 120 is configured to partially engage the lockup clutch 140 to transmit torque to the drive unit 112 from the vehicle load 118 so that the rotational speed of the drive unit output shaft 124 is maintained at or substantially at a target speed that is above the reference threshold speed. Because slip control between the pump 134 and the turbine 136 by the vehicle control module 120 through partial engagement of the lockup clutch 140 transmits negative torque from the vehicle load 118 to the drive unit output shaft 124 through the lockup clutch 140, such control may be described as negative slip control. Put differently, slip control between the pump 134 and the turbine 136 by the vehicle control module 120 through partial engagement of the lockup clutch 140 is characterized by the rotational speed of the turbine shaft 128 being greater than the rotational speed of the pump shaft 126.

Figure 2:
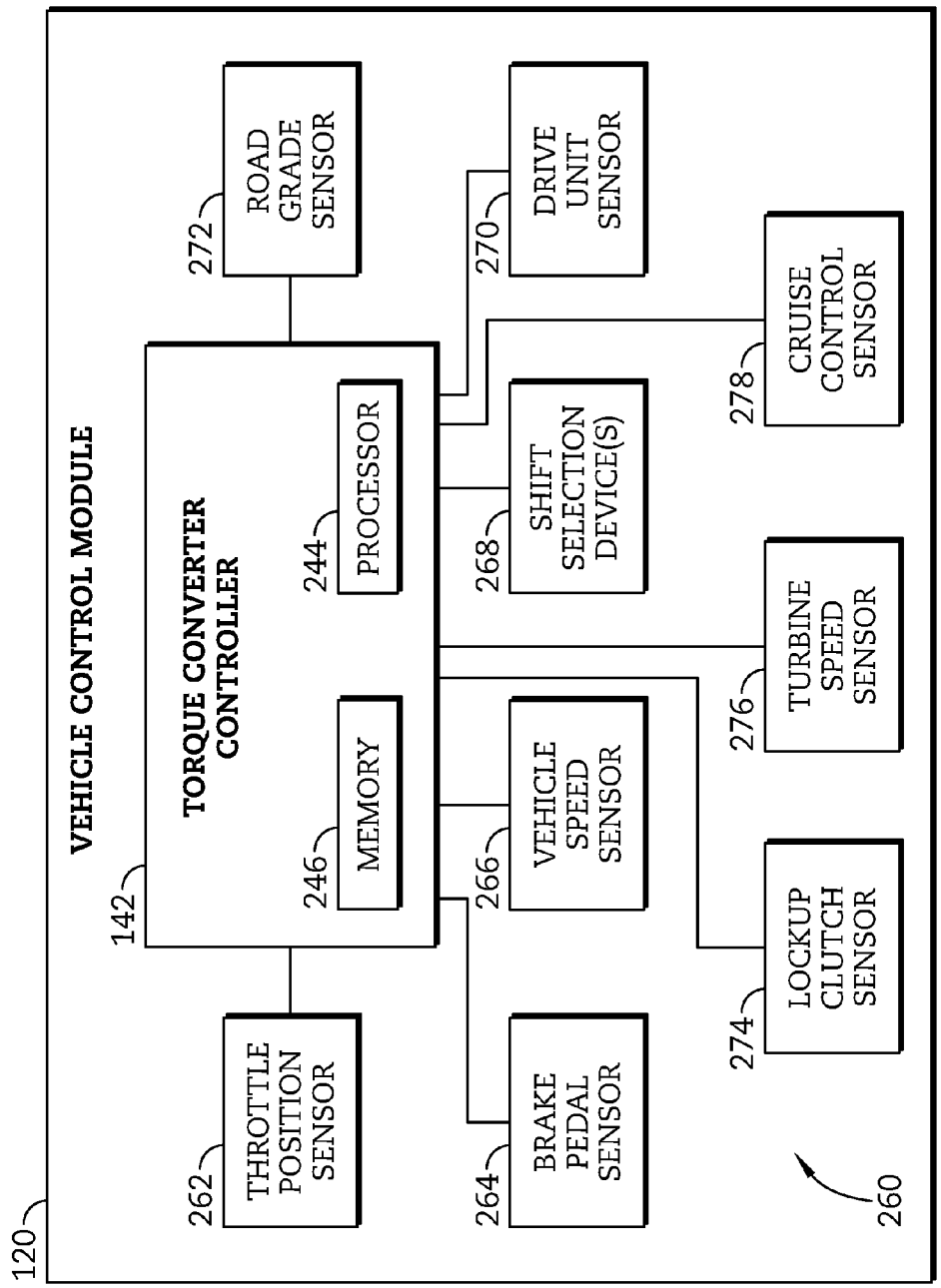
FIG. 2 is a block diagrammatic view of a vehicle control module for the motor vehicle of FIG. 1 including a torque converter controller.

Referring now to FIG. 2, an illustrative embodiment of the vehicle control module 120 includes a torque converter controller 142. Though not shown in FIG. 2, the vehicle control module 120 may also include an engine control circuit and/or a transmission control circuit as indicated above. Each of the engine control circuit and the transmission control circuit may include a memory unit having instructions stored therein and a processor configured to execute the instructions stored in the memory unit to control the particular component (i.e., the drive unit 112 and the transmission 114). The torque converter controller 142, the engine control circuit, and the transmission control circuit may be coupled to one another.

The torque converter controller 142 is configured to control the operation of the torque converter 116, including the disengagement/engagement of the lockup clutch 140. The torque converter controller 142 illustratively includes a microprocessor 244 and a memory unit 246. The microprocessor 244 may be embodied as any type of processor capable of performing the functions described herein. For example, the microprocessor 244 may be embodied as a single or multi-core processor(s), digital signal processor, microcontroller, or other processor or processing/controlling circuit. Similarly, the memory unit 246 may be embodied as any type of volatile or non-volatile memory or data storage capable of performing the functions described herein. In operation, the memory unit 246 may store various data, software, and instructions that are executable by the microprocessor 244 during operation of the torque converter controller 142 to facilitate control of the torque converter 116. In some embodiments, the microprocessor 244, memory unit 246, and/or other components of the torque converter controller 142 may form a portion of a system-on-a-chip (SoC) and be incorporated together on a single integrated circuit chip. Of course, the present disclosure also contemplates other embodiments in which the torque converter controller 142 is not microprocessor-based, but is configured to control operation of the torque converter 116 based on one or more sets of hardwired instructions, discrete circuitry, and/or software instructions stored in the memory unit 246.

The torque converter controller 142 receives electrical data from sensors or input devices 260 as shown in FIG. 2. Illustratively, the sensors/input device 260 include a throttle position sensor 262, a brake pedal sensor 264, a vehicle speed sensor 266, one or more shift selection devices 268, a drive unit sensor 270, a road grade sensor 272, a lockup clutch sensor 274, a turbine speed sensor 276, and a cruise control sensor 278. As discussed above, the vehicle control module 120 (through the torque converter controller 142) is configured to detect, based on electrical inputs from each of the input devices 260 (except for, possibly, the turbine speed sensor 276, the lockup clutch sensor 274, the vehicle speed sensor 266, and the cruise control sensor 278), when the vehicle 110 is coasting and control the disengagement of the lockup clutch 140 in response to detecting that the vehicle 110 is coasting. Subsequent to disengagement of the lockup clutch 140 in response to detecting the coasting condition, as indicated above, the torque converter controller 142 is configured to partially engage the lockup clutch 140 to maintain the rotational speed of the drive unit output shaft 124 at or substantially at the target speed that is above the reference threshold speed.

The throttle position sensor 262 may be embodied as any type of sensor or other device capable of sensing the position of an accelerator or throttle pedal (not shown) of the motor vehicle 110 and providing a signal to the torque converter controller 142 indicative of the throttle pedal position. In the operating sequence illustrated in FIG. 3, the throttle position sensor 262 provides a throttle pedal signal to the torque converter controller 142 indicating whether the throttle pedal is depressed (power from the drive unit 112 requested) or not depressed (no power requested from the drive unit 112). In some embodiments, the throttle position sensor 262 may be physically coupled to the accelerator pedal. Additionally, the throttle position sensor 262 is communicatively coupled to the torque converter controller 142 as shown in FIG. 2, and may be further communicatively coupled to the engine control circuit and/or the transmission control circuit of the vehicle control module 120 in some embodiments.

The brake pedal sensor 264 may be embodied as any type of sensor or other device capable of sensing the position of a brake pedal (not shown) of the motor vehicle 110 and providing a signal to the torque converter controller 142 indicative of the brake pedal position. In the operating sequence illustrated in FIG. 3, the brake pedal position sensor 264 provides a brake pedal signal to the torque converter controller 142 indicating whether the brake pedal is depressed (reduction in the speed of the vehicle load 118 desired) or not depressed (no reduction in the speed of the vehicle load 118 desired). In some embodiments, the brake pedal sensor 264 may be physically coupled to the brake pedal. Additionally, the brake pedal sensor 264 is communicatively coupled to the torque converter controller 142, and may be further communicatively coupled to the engine control circuit and/or the transmission control circuit of the vehicle control module 120 in some embodiments.

The vehicle speed sensor 266 may be embodied as any type of sensor or other device capable of sensing the speed of the vehicle load 118 and providing a vehicle speed signal to the torque converter controller 142 indicative of the sensed speed. In some embodiments, the vehicle speed sensor 266 may be coupled to the vehicle load 118 and positioned adjacent to one or more drive wheels of the vehicle load 118. The vehicle speed sensor 266 is communicatively coupled to the torque converter controller 142, and may be further communicatively coupled to the engine control circuit and/or the transmission control circuit of the vehicle control module 120 in some embodiments.

The shift selection device 268 may be embodied as any type of sensor or other device capable of providing a user input signal to the torque converter controller 142 indicative of one or more requests from the vehicle operator to perform a desired function. For example, the shift selection device 268 may be embodied as a conventional shift selector that is movable between different positions to indicate different user requests. In such embodiments, the shift selection device 268 may be moved to request shifts from one operating range of the transmission 114 to another operating range of the transmission 114. The shift selection device 268 may also include an on/off switch for controlling a compression release brake (not shown) included in the drive unit 112. Alternatively, the shift selection device 268 may include a conventional shift selector (first device) and a compression release brake on/off switch (second device) separate from the shift selector. Compression release brakes may be utilized in vehicles having diesel engines to reduce compressed air buildup in cylinders of the diesel engine so that when the vehicle is coasting, the reduced compressed air buildup causes less energy to be transmitted from the engine to the crankshaft of the vehicle than would be the case if no such brakes were present. As well known in the art, for a diesel engine application, the compression release brakes include a valve that is used to release pressure from the engine cylinders to induce the braking effect. In some embodiments, the shift selection device 268 may be physically coupled to the drive unit 112 and the transmission 114. Additionally, the shift selection device 268 is communicatively coupled to the torque converter circuit 142, and may be further communicatively coupled to the engine control circuit and/or the transmission control circuit.

The drive unit sensor 270 may be embodied as any type of sensor or other device capable of sensing the rotational speed of the output shaft 124 of the drive unit 112 and providing a signal to the torque converter controller 142 indicative of the sensed speed. Based on the sensed speed of the output shaft 124, torque associated with the drive unit 112 (i.e., the drive unit output shaft 124) may be determined. In one example, when torque generated by the drive unit 112 is transmitted to the transmission 114 through the torque converter 116 during a non-coasting condition of the vehicle 110, the signal provided by the drive unit sensor 270 to the torque converter controller 142 may be used to determine the torque output by the drive unit 112. In another example, during negative slip control between the pump 134 and the turbine 136 by the vehicle control module 120 as indicated above, the signal provided by the drive unit sensor 270 to the torque converter controller 142 may be used to determine the torque provided to the drive unit 112 by the vehicle load 118 through the lockup clutch 140. The signal provided by the drive unit sensor 270 may therefore be a torque signal indicative of the torque at the output shaft 124 of the drive unit 112. The drive unit sensor 270 may be coupled to the output shaft 124 of the drive unit 112. As such, the drive unit sensor 270 may be used to sense the rotational speed of the pump shaft 126 of the torque converter 116. The drive unit sensor 270 is communicatively coupled to the torque converter controller 142, and may be further communicatively coupled to the engine control circuit and/or the transmission control circuit.

The road grade sensor 272 may be embodied as any type of sensor or other device capable of sensing the grade of the surface on which the vehicle 110 is traveling and providing a road grade signal to the torque converter controller 142 indicative of the sensed grade. The road grade sensor 272 may be physically coupled to the vehicle load 118 and positioned adjacent to one or more wheels of the vehicle load 118. Additionally, the road grade sensor 272 is communicatively coupled to the torque converter controller 142, and may be further communicatively coupled to the engine control circuit and/or the transmission control circuit.

The lockup clutch sensor 274 may be embodied as any type of sensor or other device capable of sensing the disengagement of the lockup clutch 140 and providing a lockup clutch signal to the torque converter controller 142 indicative of the sensed disengagement. For example, to sense the disengagement of the lockup clutch 140, the lockup clutch sensor 274 may sense the number of disengagement cycles (i.e., the number of times that the lockup clutch 140 is disengaged) over a reference time period and/or distance and provide a signal to the controller 142 indicative of the sensed disengagement cycles. The lockup clutch sensor 274 may sense disengagement of the lockup clutch 140 based on a hydraulic fluid pressure associated with the lockup clutch 140, such as a hydraulic fluid pressure detected in a cavity of the lockup clutch 140. Input provided to the controller 142 by the vehicle speed sensor 266 may be used to establish the reference time period and/or distance over which disengagement of the lockup clutch 140 is sensed by the sensor 274.

The turbine speed sensor 276 may be embodied as any type of sensor or other device capable of sensing the rotational speed of the turbine shaft 128 and providing a turbine speed signal to the torque converter controller 142 indicative of the sensed speed. The turbine speed sensor 276 may be physically coupled to the turbine shaft 128 of the torque converter 116. As such, the turbine speed sensor 276 may be used to sense the rotational speed of the transmission input shaft 130. Additionally, the turbine speed sensor 276 is communicatively coupled to the torque converter controller 142, and may be further communicatively coupled to the engine control circuit and/or the transmission control circuit.

The cruise control sensor 278 may be embodied as any type of sensor or other device capable of sensing a cruise speed input by a user and providing a cruise speed signal to the torque converter controller 142 indicative of the sensed speed. The cruise speed signal may indicate that a cruise control feature of the vehicle 110 is active. In some embodiments, the cruise control sensor 278 may be provided separately from the shift selection device 268. In other embodiments, the cruise control sensor 278 may be included in the shift selection device 268.

Although the vehicle control module 120 has been described above as including specific sensors and other input devices, it should be appreciated that the vehicle control module 120 may include different or additional input devices in other embodiments. For example, in some embodiments, the input devices of the vehicle control module 120 may include additional sensors configured to sense additional or other operation characteristics of the torque converter 116, the lockup clutch 140, and/or other components of the motor vehicle 110.

Figure 3:
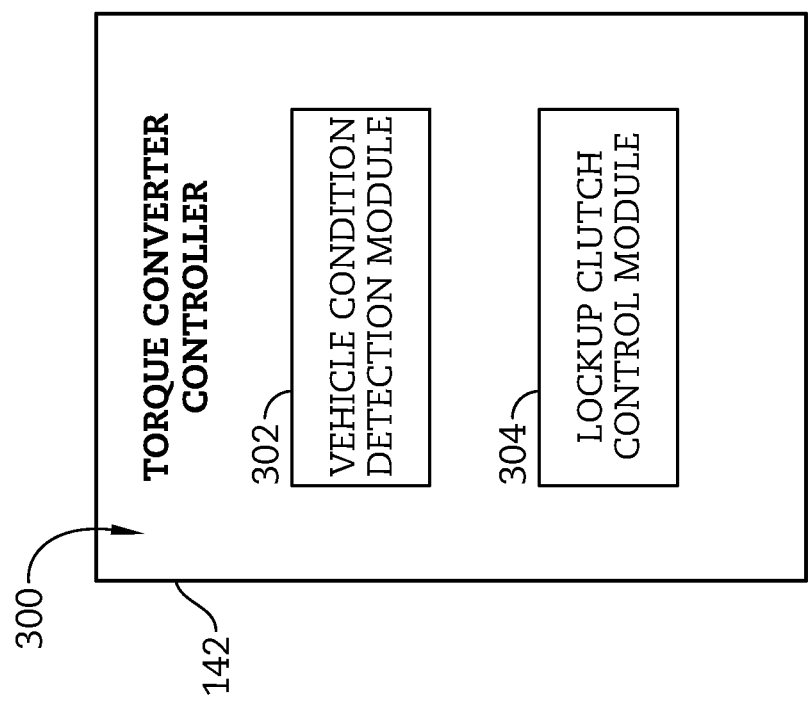
FIG. 3 is a simplified block diagram of at least one embodiment of an environment that may be established by the torque converter controller of FIG. 2.

Referring now to FIG. 3, in the illustrative embodiment, the torque converter controller 142 establishes an environment 300 during operation. The illustrative environment 300 includes a vehicle condition detection module 302 and a lockup clutch control module 304. Each of the modules, logic, and other components of the environment 300 may be embodied as hardware, firmware, software, or a combination thereof. As such, in some embodiments, one or more modules of the environment 300 may be embodied as circuitry or a collection of electrical devices. In such embodiments, one or more of the vehicle condition detection module 302 and the lockup clutch control module 304 may form a portion of the processor 244 and/or other components of the torque converter controller 142. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the processor 244 or other components of the torque converter controller 142.

The vehicle condition detection module 302, which may be embodied as hardware, firmware, software, virtualized hardware, emulated architecture, and/or a combination thereof as discussed above, is configured to receive signals from the throttle position sensor 262, the brake pedal sensor 264, the shift selection device 268, the drive unit sensor 270, and the road grade sensor 272 and detect, based on those signals, whether the vehicle 110 is in the coasting condition. The vehicle condition detection module 302 is further configured to receive the signal from the lockup clutch sensor 274 and detect, based on that signal, whether disengagement of the lockup clutch 140 is below the reference threshold. Further still, the vehicle condition detection module 302 is configured to receive the signals from the vehicle speed sensor 266 and the turbine speed sensor 276 and detect, based on those signals, the respective speeds of the vehicle load 118 and the turbine 136.

The lockup clutch control module 304, which may be embodied as hardware, firmware, software, virtualized hardware, emulated architecture, and/or a combination thereof as discussed above, is configured to control the disengagement and/or engagement of the lockup clutch 140 in response to the input provided to the vehicle condition detection module 302. In response to the vehicle condition detection module 302 detecting that the vehicle 110 is in the coasting condition and that disengagement of the lockup clutch 140 is below the reference threshold, the lockup clutch control module 304 is configured to disengage the lockup clutch 140. Subsequent to disengaging the lockup clutch 140, and in response to the vehicle condition module 302 detecting that the rotational speed of the output shaft 124 has reached the target speed, the lockup clutch control module 304 is configured to partially engage the lockup clutch 140 to control slip between the pump 134 and the turbine 136 based at least in part on the speed of the turbine 136 detected by the module 302. Subsequent to partially engaging the lockup clutch 140 to control slip between the pump 134 and the turbine 136, the lockup clutch control module 304 is configured to fully engage the lockup clutch 140 based on the speed of the vehicle load 118 detected by the module 302.

Figure 4:
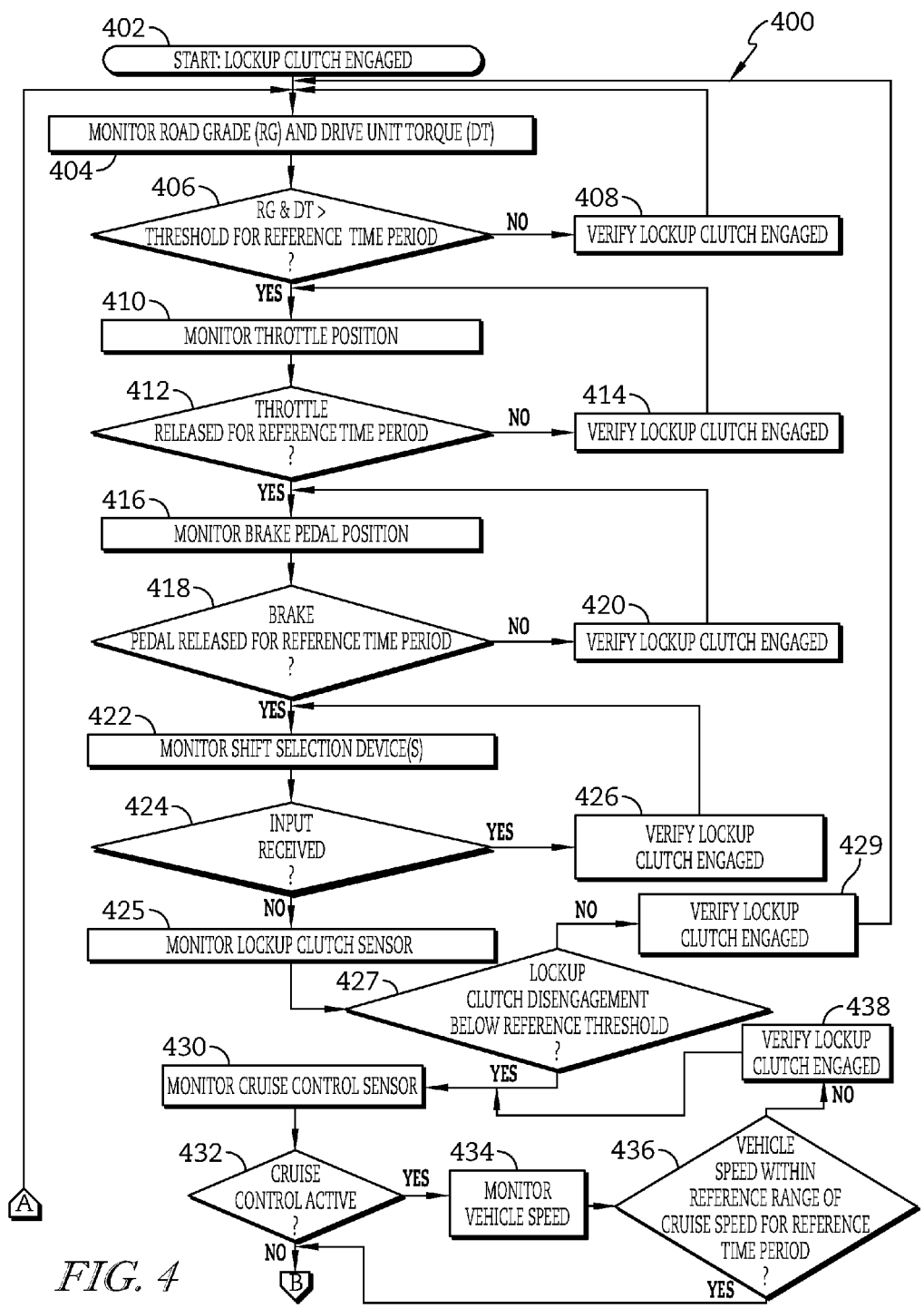
FIGS. 4 and 5 are a simplified flowchart of at least one embodiment of a method for controlling the torque converter lockup clutch of FIG. 1 that may be executed by the vehicle control module of FIG. 2.
Figure 5:
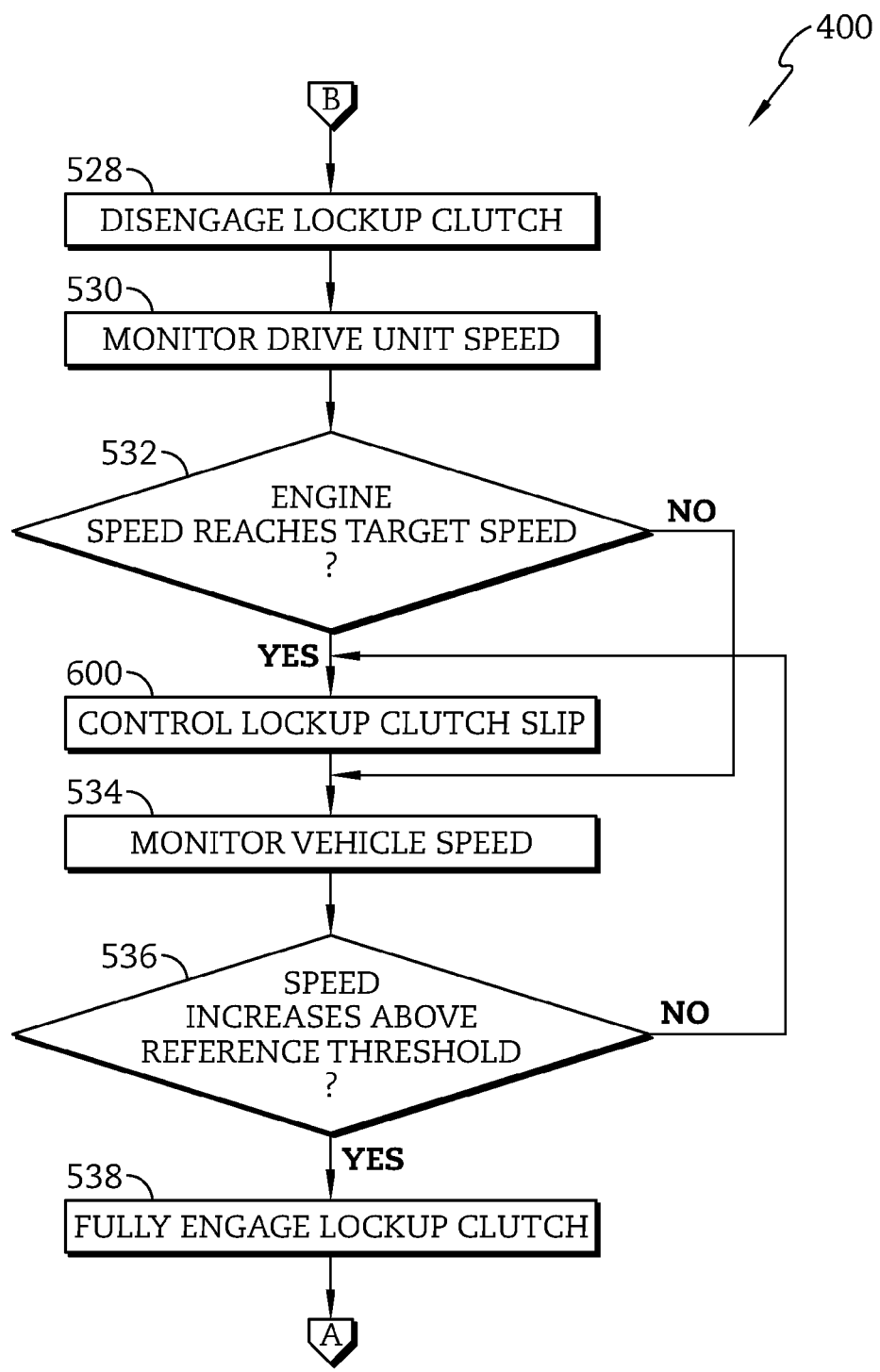

Referring now to FIGS. 4 and 5, in use, the torque converter controller 142 may execute a method 400 for controlling the disengagement of the lockup clutch 140. The method 400 may be embodied, in whole or in part, as instructions stored in the memory 246, or other machine-readable storage medium, of the torque converter controller 142, and the microprocessor 244 of the torque converter controller 142 may be configured to execute the instructions to control the torque converter 116.

The method 400 begins with block 402 as shown in FIG. 4. When the torque converter controller 142 initiates the method 400 at the block 402, the lockup clutch 140 of the torque converter 116 is engaged such that the pump 134 is directly connected to the turbine 136 as indicated above. Following block 402, the torque converter controller 142 detects whether the motor vehicle 110 is in the coasting condition as discussed below.

The method 400 proceeds to block 404 in which the torque converter controller 142 monitors, or determines, the grade of the surface on which the motor vehicle 110 is traveling based on the sensor input data received from the road grade sensor 272. Additionally, the torque converter controller 142 monitors, or determines, the drive unit torque at the output shaft 124 of the drive unit 112 based on the sensor input data received from the drive unit sensor 270 in block 404.

Subsequently, in block 406, the torque converter controller 142 determines whether the road grade sensed by the road grade sensor 272 and the torque sensed by the drive unit sensor 270 satisfy a reference threshold for a reference amount of time (e.g., when the road grade exceeds a minimum road grade for a minimum amount of time). The reference threshold for the road grade sensor 272 may be based on a grade corresponding to a desired amount of torque sensed at the output shaft 124 by the drive unit sensor 270. For example, the reference threshold may be based on a downwardly-sloping grade corresponding to a drive unit output torque that is at or near zero. In other embodiments, reference thresholds for both the road grade sensed by the road grade sensor 272 and the drive unit torque sensed by the drive unit sensor 270 may be determined independently of one another. In some embodiments, the reference thresholds may be stored in the memory 246. As discussed below, the torque converter controller 142 disengages the lockup clutch 140 in response to, among other things, a determination that the road grade and engine output torque meet their respective reference thresholds for their respective reference amounts of time.

If the torque converter controller 142 determines at block 406 that the road grade sensed by the road grade sensor 272 and the drive unit torque sensed by the drive unit sensor 270 do not meet their respective thresholds for their respective amounts of time, the method 400 proceeds to block 408. In block 408, the torque converter controller 142 verifies that the lockup clutch 140 is engaged, and the method 400 subsequently loops back to block 404 in which the torque converter controller 142 continues to monitor, or determine, the grade of the surface on which the motor vehicle 110 is traveling and the drive unit torque at the output shaft 124.

If, however, the road grade and the drive unit output torque satisfy the reference thresholds for the reference amounts of time, the method 400 proceeds to block 410 in which the torque converter controller 142 monitors, or determines, the position of the throttle pedal based on the sensor input data received from the throttle position sensor 262. Subsequent to block 410, the method 400 proceeds to block 412.

In block 412, the torque converter controller 142 determines, based on the sensor input data received from the throttle position sensor 262, whether the throttle pedal is released for a reference time period. As discussed above, the reference time period may be stored in the memory 246 in some embodiments.

As discussed below, the torque converter controller 142 is configured to disengage the lockup clutch 140 in response to, among other things, a determination that the throttle pedal is released for the reference time period. However, if the torque converter controller 142 determines in block 412 that the throttle pedal is not released for the reference time period, the method 400 proceeds to block 414. In block 414, the torque converter controller 142 verifies that the lockup clutch 140 is engaged and, the method 400 subsequently loops back to block 410 in which the torque converter controller continues to monitor, or determine, the position of the throttle pedal. If, however, the torque converter controller 142 determines that the throttle pedal has been released for the reference time period in block 412, the method 400 proceeds to block 416.

In block 416, the torque converter controller 142 monitors, or determines, the position of the brake pedal based on the input from the brake pedal sensor 264. Subsequently, in block 418, the torque converter controller 142 determines, based on the sensor input data from the brake pedal sensor 264, whether the brake pedal is released for a reference time period. Again, as discussed above, the reference time period may be stored in the memory 246 in some embodiments.

As discussed below, the torque converter controller 142 disengages the lockup clutch 140 in response to, among other things, a determination that the brake pedal is released for the reference time period. However, if the torque converter controller 142 determines in block 418 that the brake pedal is not released for the reference time period, the method 400 proceeds to block 420. In block 420, the torque converter controller 142 verifies that the lockup clutch 140 is engaged and, the method 400 subsequently loops back to block 416 in which the torque converter controller 142 continues to monitor, or determine, the position of the brake pedal. If, however, the torque converter controller 142 determines that the brake pedal has been released for the reference time period in block 418, the method 400 proceeds to block 422.

In block 422, the torque converter controller 142 monitors, or determines activation/manipulation of, the shift selection device(s) 268 based on input data from the shift selection device(s) 268. Subsequently, in block 424, the torque converter controller 142 determines whether the torque converter controller 142 has received input data from the shift selection device(s) 268 indicative of one or more user requests. For example, the input data provided to the torque converter controller 142 by the shift selection device(s) 268 may indicate, among other things, that the vehicle operator has requested an upshift, the vehicle operator has requested a downshift, or the vehicle operator has turned on the compression release brake switch.

As discussed below, the torque converter controller 142 disengages the lockup clutch 140 in response to, among other things, determining that no input is received from the shift selection device(s) 268. However, if the torque converter controller 142 determines at block 424 that input is received from the shift selection device(s) 268, the method 400 proceeds to block 426. In block 426, the torque converter controller 142 verifies that the lockup clutch 140 is engaged and, the method 400 subsequently loops back to block 422 in which the torque converter controller 142 continues to monitor, or determine activation/manipulation of, the shift selection device(s) 268. If, however, the torque converter controller 142 determines that no input has been received from the shift selection device(s) 268 in block 424, the method 400 proceeds to block 425.

In block 425, the torque converter controller 142 monitors, or determines, the state of the lockup clutch sensor 274 based on the input from the lockup clutch sensor 274. Upon reaching block 425 and completing blocks 406, 412, 418, and 424, the torque converter controller 142 determines that the vehicle 110 is in the coasting condition. That is, as described below, the method 400 limits disengagement of the lockup clutch 140 at least to the situation in which the vehicle 110 is in the coasting condition (i.e., as indicated by blocks 406, 412, 418, and 424) and over-usage of the lockup clutch 140 has not been detected. As such, in block 427, the torque converter controller 142 determines, based on input from the lockup clutch sensor 274, whether disengagement of the lockup clutch 140 is below a reference threshold. The reference threshold may correspond to a number of disengagement cycles of the lockup clutch 140 over a reference time period and/or distance that does not lead to excessive wear and/or degradation of the lockup clutch 140. As such, sensed disengagement of the clutch 140 by the sensor 274 above the reference threshold represents undesired over-usage of the clutch 140 such that subsequent disengagement of the clutch 140 may not occur, whereas sensed disengagement of the clutch 140 by the sensor 274 below the reference threshold represents acceptable usage of the clutch 140 such that subsequent disengagement of the clutch 140 may occur.

If the torque converter controller 142 determines at block 427 that the lockup clutch 140 disengagement does not fall below the reference threshold, the method 400 proceeds to block 429. In block 429, the torque converter controller 142 verifies that the lockup clutch 140 is engaged, and the method 400 subsequently loops back to block 404 in which the torque converter controller 142 continues to monitor, or determine, the grade of the surface on which the motor vehicle 110 is traveling and the drive unit torque at the output shaft 124.

If, however, the torque converter controller 142 determines that disengagement of the lockup clutch 140 is below the reference threshold, the method 400 proceeds to block 430. In block 430, the torque converter controller 142 monitors, or determines, the state of the cruise control sensor 278 based on input from the cruise control sensor 278. The method 400 proceeds from block 430 to block 432 as shown in FIG. 4.

In block 432, the torque converter controller 142 determines, based on input from the cruise control sensor 278, whether the cruise control feature of the vehicle 110 is active. If no input is provided by the cruise control sensor 278, the torque converter controller 142 determines that the cruise control feature is not active and the method 400 proceeds to block 528. If, however, input (i.e., the cruise speed input by the user) is provided by the cruise control sensor 278, the method 400 proceeds to block 434.

In block 434, the torque converter controller 142 monitors, or determines, the state of the vehicle speed sensor 266 based on input from the vehicle speed sensor 266. The method 400 proceeds from block 434 to block 436 as shown in FIG. 4.

In block 436, the torque converter controller 142 determines, based on input from the cruise control sensor 278 and the vehicle speed sensor 266, whether the vehicle speed sensed by the vehicle speed sensor 266 is within a reference range of the cruise speed sensed by the cruise control sensor 278 for a reference time period. If the vehicle speed is within the reference range of the cruise speed for the reference time period, the method 400 proceeds to block 528. If, however, the vehicle speed is not within the reference range of the cruise speed for the reference time period, the method 400 proceeds to block 438. In block 438, the torque converter controller 142 verifies that the lockup clutch 140 is engaged and, the method 400 subsequently loops back to block 430 in which the torque converter controller 142 continues to monitor, or determine, the state of the cruise control sensor 278.

The method 400 may proceed to block 528 following completion of the block 432 or the block 436 as shown in FIG. 5 and as indicated above. In block 528, the torque converter controller 142 disengages the lockup clutch 140. Subsequently, in block 530, the torque converter controller 142 monitors, or determines, the rotational speed of the output shaft 124 of the drive unit 112 based on the input from the drive unit sensor 270. In block 532, the torque converter controller 142 determines whether the rotational speed of the output shaft 124 has reached the target engine speed based on the input from the drive unit sensor 270. As indicated above, the target engine speed is greater than the reference threshold associated with idle operation of the drive unit 112. The target engine speed may be stored in the memory 246 of the torque converter controller 142, and the target engine speed may serve as an indicator that the rotational speed of the output shaft 124 is likely to decrease from the target engine speed to the reference threshold. For example, the target engine speed may be a value that, based on experience with the particular vehicle 110 and the components thereof, is sufficiently close to the reference threshold that attainment of the target engine speed indicates that the rotational speed of the output shaft 124 is likely to drop from the target engine speed to the reference threshold. In some embodiments, the target engine speed may vary depending on the blade geometry or K-factor of blades included in the pump 134, the turbine 136, and the stator 138.

If the torque converter controller 142 determines that the rotational speed of the output shaft 124 has reached the target engine speed, the method 400 advances to block 600 in which the torque converter controller 142 controls the lockup clutch slip (i.e., the slip between the pump 134 and the turbine 136) through partial engagement of the lockup clutch 140 to maintain the rotational speed of the output shaft 124 at or substantially at the target engine speed. To do so, the torque converter controller 142 may execute a method 600 as shown in FIG. 6. The method 600 may be embodied as instructions stored in the memory 246 of the torque converter controller 142, and the microprocessor 244 of the torque converter controller 142 may execute the instructions to control the torque converter 116.

The method 600 begins at blocks 602 and 604, which may be executed by the torque converter controller 142 substantially contemporaneously. Alternatively, one of the blocks 602 and 604 may be executed by the torque converter controller 142 before the other of the blocks 602 and 604. In any case, in block 602, the torque converter controller 142 monitors, or determines, the speed of the turbine shaft 128 based on the signal provided to the torque converter controller 142 by the turbine speed sensor 276. In block 604, the torque converter controller 142 monitors, or determines, torque associated with the drive unit 112 based on the signal provided to the torque converter controller 142 by the drive unit sensor 270. The torque associated with the drive unit 112 that is indicated by the drive unit sensor 270 signal may be indicative of torque provided to the drive unit 112 by the vehicle load 118 prior to disengagement of the lockup clutch 140. As such, the torque associated with the drive unit 112 in the block 604 may be described as negative torque, whereas torque that is output by the drive unit 112 to the vehicle load 118 through the torque converter 116 may be described as positive torque.

The method 600 proceeds to block 606 following the block 602. The blocks 604 and 606 may be executed by the torque converter controller 142 substantially contemporaneously in some embodiments. Alternatively, one of the blocks 604 and 606 may be executed by the torque converter controller 142 before the other of the blocks 604 and 606. In any case, in block 606, the torque converter controller 142 determines a target torque output by the pump shaft 126 to the drive unit 112. The target torque output corresponds to torque output by the pump shaft 126 to the drive unit 112 at a target slip speed. The target slip speed corresponds to the difference between the target engine speed, which may be stored in the memory 246 of the torque converter controller 142 as indicated above, and the monitored speed of the turbine shaft 128, which is provided to the torque converter controller 142 by the turbine speed sensor 276 in block 602.

Following blocks 606 and 604, the method 600 proceeds to block 608 in which the torque converter controller 142 calculates a lockup clutch torque based on the target torque output by the pump shaft 126 that is determined by the torque converter controller 142 in block 606 and the torque input associated with the drive unit 112 that is provided by the drive unit sensor 270 to the torque converter controller 142 in block 604. In the illustrative embodiment, the torque converter controller 142 calculates the lockup clutch torque by determining the difference between the torque input associated with the drive unit 112 (which may be negative torque as indicated above) and the target torque output by the pump shaft 126 to the drive unit 112.

In block 610, the torque converter controller 142 determines a lockup clutch engagement pressure based on the lockup clutch torque calculated in block 608. The lockup clutch engagement pressure is embodied as, or otherwise includes, a hydraulic fluid pressure to be applied to the lockup clutch 140 by the torque converter controller 142 to engage the lockup clutch 140 to cause the calculated lockup clutch torque to be transmitted to the drive unit 112 through the lockup clutch 140. Because the calculated lockup clutch torque is based on the target slip speed between the pump 134 and the turbine 136, application of the lockup engagement pressure to the lockup clutch 140 causes partial engagement of the lockup clutch 140.

Subsequently, in block 612, the torque converter controller 142 applies the lockup clutch engagement pressure determined in block 610 to the lockup clutch 140 to partially engage the lockup clutch 140 to cause the calculated lockup clutch torque to be transmitted to the drive unit 112 through the lockup clutch 140. It should be appreciated that when the calculated lockup clutch torque is transmitted to the drive unit 112 through the lockup clutch 140, the speed of the output shaft 124 is maintained above the reference threshold to avoid consuming fuel during idle operation of the drive unit 112.

In the illustrative embodiment, the torque converter 116 is configured to apply the lockup clutch engagement pressure to the lockup clutch 140 to partially engage the lockup clutch 140 as indicated above such that no or substantially no fuel is consumed during idle operation of the drive unit 112. As such, application of the lockup clutch 140 occurs in sufficient time to avoid such fuel consumption.

Upon completing block 612, the torque converter controller 142 executes a single iteration of the method 600 shown in FIG. 6. To execute additional iterations of the method 600 during operation of the motor vehicle 110 to perform negative slip control, the method 600 returns to blocks 602 and 604 and proceeds as described above. The negative slip control performed by the torque converter controller 142 according to the method 600 may therefore be described as closed-loop slip control. The torque converter controller 142 executes the method 600 until a reference condition occurs, as described in greater detail below.

Returning back to FIG. 5, during execution of the method 600, the torque converter controller 142 monitors, or determines, the speed of the vehicle load 118 based on the signal provided to the torque converter controller 142 by the vehicle speed sensor 266 in block 534. In block 536, the torque converter controller 142 determines, based on input from the vehicle speed sensor 266 provided to the torque converter controller 142 in block 534, whether the speed of the vehicle load 118 has increased above a reference threshold during execution of the sub-method 600.

If the torque converter controller 142 determines at block 536 that the speed of the vehicle load 118 has not increased above the reference threshold during execution of the method 600, the method 400 loops back to block 600 in which the torque converter controller 142 continues to control lockup clutch slip. That is, if the torque converter controller 142 determines that the speed of the vehicle load 118 has not increased above the reference threshold, execution of the method 600 continues.

If, however, the torque converter controller 142 determines at block 536 that the speed of the vehicle load 118 has increased above the reference threshold, the method 400 advances to block 538. In block 538, the torque converter controller 142 fully engages the lockup clutch 140. From block 538, the method 400 returns to the block 404 of FIG. 4 in which the torque converter controller 142 continues to monitor the grade of the surface on which the motor vehicle 110 is traveling.

Referring back to block 532, if the torque converter controller 142 determines at block 532 that the rotational speed of the output shaft 124 has not reached the target engine speed, the method 400 proceeds to block 534 as shown in FIG. 5. As such, the torque converter controller 142 does not execute the method 600 in response to determining that the rotational speed of the output shaft 124 has not reached the target engine speed in block 532.

In summary, as shown in the method 400 of FIGS. 4 and 5, the torque converter controller 142 is configured to detect when the vehicle 110 is coasting based on input from the sensors 260 (i.e., the road grade sensor 272; the drive unit sensor 270; the shift selection device(s) 268; the brake pedal sensor 264; and the throttle position sensor 262). Additionally, as shown in the method 400, the torque converter controller 142 is configured to disengage the lockup clutch 140 in response to determining that: the road grade and the drive unit torque meet their respective thresholds for their respective amounts of time; the throttle pedal is not depressed for the reference time period; the brake pedal is not depressed for the reference time period; the shift selection device(s) 268 do not provide input to the torque converter controller 142; disengagement of the lockup clutch 140 is below the reference threshold; and the vehicle speed is within the reference range of the cruise speed for the reference time period. Following the initial disengagement of the lockup clutch 140, and in response to determining that the rotational speed of the output shaft 124 has reached the target engine speed based on the input provided by the drive unit sensor 270, the torque converter controller 142 is configured to perform negative slip control according to the method 600 of FIG. 6 to maintain the rotational speed of the output shaft 124 above the reference threshold associated with idle operation of the drive unit 112. The torque converter controller 142 is configured to continue performing negative slip control in response to determining that the speed of the vehicle load 118 did not increase above the reference threshold. The torque converter controller 142 is configured to stop performing negative slip control and fully engage the lockup clutch 140 in response to determining that the speed of the vehicle 18 did increase above the reference threshold.

Of course, it should be appreciated that the method 400 may be adjusted so that rather than executing the blocks successively in the sequence shown in FIGS. 4 and 5, the torque converter controller 142 may execute the blocks of the method 400 in a different sequence and/or contemporaneously with each other. As an example, blocks 410, 412 may be executed before blocks 404, 406 are executed. In another example, blocks 416, 418 may be executed before blocks 404, 406 are executed. In yet another example, blocks 422, 424 may be executed before blocks 404, 406 are executed. In yet another example, blocks (i) 404, 406, (ii) 410, 412, (iii) 416, 418, and (iv) 422, 424 may be executed in parallel with one another by the torque converter controller 142 (i.e., the blocks are executed contemporaneously).

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

The invention claimed is:

1. A system for a vehicle, the system comprising:
a drive unit configured to output torque, the drive unit including an output shaft,
a transmission configured to transmit torque output by the drive unit to a load, the transmission including an input shaft,
a torque converter coupled between the drive unit and the transmission, the torque converter including a pump coupled to the output shaft of the drive unit, a turbine coupled to the input shaft of the transmission, a lockup clutch selectively engageable to mechanically couple the pump to the turbine to transmit torque between the drive unit and the transmission; and
a torque converter controller having a processor and memory, the memory having instructions stored therein that are executable by the processor to cause the processor to (i) determine whether the vehicle is in a coasting condition, (ii) determine whether a rotational speed of the output shaft of the drive unit has reached a target speed above a reference threshold, and (iii) engage the lockup clutch to maintain the rotational speed of the output shaft above the reference threshold in response to a determination that the motor vehicle is in the coasting condition and that the rotational speed of the output shaft has reached the target speed.

2. The system of claim 1, wherein the reference threshold defines a rotational speed of the output shaft of the drive unit associated with idle operation of the drive unit, and wherein to engage the lockup clutch to maintain the rotational speed of the output shaft above the reference threshold comprises to control slip between the turbine and the pump to maintain the rotational speed of the output shaft above the reference threshold to avoid fuel consumption during idle operation of the drive unit.

3. The system of claim 1, wherein to engage the lockup clutch comprises to engage the lockup clutch to transmit torque from the turbine to the pump.

4. The system of claim 3, wherein to engage the lockup clutch comprises to partially engage the lockup clutch to achieve slip between the turbine and the pump characterized by a rotational speed of the turbine being greater than a rotational speed of the pump.

5. The system of claim 1, wherein to engage the lockup clutch comprises to receive a signal indicative of a rotational speed of the turbine and determine a target torque output by the pump based on the target speed of the output shaft of the drive unit and the signal.

6. The system of claim 5, wherein to engage the lockup clutch comprises to receive a torque signal indicative of torque associated with the drive unit.

7. The system of claim 6, wherein to engage the lockup clutch comprises to calculate a lockup clutch torque based on the determined target torque output by the pump and the torque signal.

8. The system of claim 1, wherein to determine whether the vehicle is in the coasting condition comprises to determine whether the vehicle is in the coasting condition based on (i) a road grade signal indicative of a grade of a surface in contact with the vehicle, (ii) a torque signal indicative of torque associated with the drive unit, (iii) an accelerator pedal signal indicative of depression of an accelerator pedal of the motor vehicle, (iv) a brake pedal signal indicative of depression of a brake pedal of the motor vehicle, and (v) a user input signal indicative of activity performed by a user.

9. A control system for a vehicle, the vehicle including a drive unit, a transmission, and a torque converter having a lockup clutch selectively engageable to mechanically couple a pump of the torque converter to a turbine of the torque converter, the control system comprising:
 a plurality of sensors configured to produce sensor data, wherein the sensor data is cooperatively indicative of a coasting condition of the vehicle;
 a drive unit speed sensor configured to provide a signal indicative of a rotational speed of an output shaft of the drive unit, and
 a torque converter controller coupled to each of the plurality of sensors and the drive unit speed sensor, the torque converter controller including a processor and memory, the memory having instructions stored therein that are executable by the processor to cause the processor to (i) determine whether the vehicle is in the coasting condition based on the sensor data produced by the plurality of sensors, (ii) determine whether the rotational speed of the output shaft of the drive unit has reached a target speed above a reference threshold based on the signal from the drive unit speed sensor, and (iii) engage the lockup clutch to maintain the rotational speed of the output shaft above the reference threshold in response to a determination that the vehicle is in the coasting condition and that the rotational speed of the output shaft has reached the target speed.

10. The control system of claim 9, further comprising a turbine speed sensor coupled to the torque converter controller and configured to provide a signal indicative of a rotational speed of the turbine,
 wherein to engage the lockup clutch comprises to determine a target torque output by the pump based on the target speed of the output shaft of the drive unit and the signal from the turbine speed sensor.

11. The control system of claim 10, wherein the plurality of sensors includes a drive unit torque sensor configured to provide a signal indicative of torque associated with the drive unit and wherein to engage the lockup clutch comprises to receive the signal from the drive unit torque sensor.

12. The control system of claim 11, wherein to engage the lockup clutch comprises to calculate a lockup clutch torque based on the determined target torque output by the pump and the signal from the drive unit torque sensor.

13. The control system of claim 12, wherein to engage the lockup clutch comprises to engage the lockup clutch so that the calculated lockup clutch torque is transmitted to the output shaft of the drive unit.

14. The control system of claim 9, wherein the plurality of sensors comprises (i) a road grade sensor configured to provide a signal indicative of a grade of a surface in contact with the vehicle, (ii) a drive unit torque sensor configured to provide a signal indicative of torque associated with the drive unit, (iii) an accelerator pedal sensor configured to provide a signal indicative of depression of an accelerator pedal of the vehicle, (iv) a brake pedal sensor configured to provide a signal indicative of depression of a brake pedal of the vehicle, and (v) a shift selector configured to provide a signal indicative of activity performed by a user.

15. The control system of claim 14, wherein to determine whether the vehicle is in the coasting condition comprises to (i) determine whether the grade of the surface exceeds a reference road grade threshold for a reference time period based on the signal from the road grade sensor, (ii) determine whether the torque associated with the drive unit exceeds a reference torque threshold for a reference time period based on the signal from the drive unit torque sensor, (iii) determine whether the accelerator pedal is depressed for a reference time period based on the signal from the accelerator pedal sensor, (iv) determine whether the brake pedal is depressed for a reference time period based on the signal from the brake pedal sensor, and (v) determine whether activity is performed by the user based on the signal from the shift selector.

16. A method of operating a vehicle, the vehicle including a drive unit, a transmission, and a torque converter having a lockup clutch selectively engageable to mechanically couple a pump of the torque converter to a turbine of the torque converter, the method executable by a torque converter controller of the torque converter, the method comprising:
 determining, based on sensor data from a plurality of sensors, whether the vehicle is in a coasting condition,
 determining, based on a signal provided by a drive unit speed sensor, whether a rotational speed of an output shaft of the drive unit has reached a target speed above a reference threshold, and
 engaging the lockup clutch to maintain the rotational speed of the output shaft above the reference threshold in response to a determination that the vehicle is in the coasting condition and that the rotational speed of the output shaft has reached the target speed.

17. The method of claim 16, further comprising receiving a signal from a turbine speed sensor indicative of a rotational speed of the turbine,
 wherein engaging the lockup clutch comprises determining a target torque output by the pump based on the target speed of the output shaft of the drive unit and the signal from the turbine speed sensor.

18. The method of claim 17, further comprising receiving a signal from a drive unit torque sensor indicative of torque associated with the drive unit,
   wherein engaging the lockup clutch comprises calculating a lockup clutch torque based on the determined target torque output by the pump and the signal from the drive unit torque sensor.

19. The method of claim 18, wherein engaging the lockup clutch comprises engaging the lockup clutch so that the calculated lockup clutch torque is transmitted to the output shaft of the drive unit.

20. The method of claim 16, wherein determining whether the vehicle is in the coasting condition comprises:
   determining whether a grade of a surface in contact with the vehicle exceeds a reference road grade threshold for a reference time period based on a signal from a road grade sensor,
   determining whether torque associated with the drive unit exceeds a reference torque threshold for a reference time period based on a signal from a drive unit torque sensor,
   determining whether an accelerator pedal is depressed for a reference time period based on a signal from an accelerator pedal sensor,
   determining whether a brake pedal is depressed for a reference time period based on a signal from a brake pedal sensor, and
   determining whether activity is performed by a user based on a signal from a shift selector.

\* \* \* \* \*